US010539949B2

(12) United States Patent
Ho et al.

(10) Patent No.: US 10,539,949 B2
(45) Date of Patent: Jan. 21, 2020

(54) THREE-DIMENSIONAL PRINTING APPRATUS AND METHOD FOR CALIBRATING PRINTING INACCURACY THEREOF

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Kwan Ho, New Taipei (TW); Yu-Jie Yang, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 865 days.

(21) Appl. No.: 14/864,901

(22) Filed: Sep. 25, 2015

(65) Prior Publication Data

US 2016/0354980 A1    Dec. 8, 2016

(30) Foreign Application Priority Data

Jun. 5, 2015 (CN) .......................... 2015 1 0304346

(51) Int. Cl.
*G05B 19/4099* (2006.01)
*B29C 64/386* (2017.01)
(Continued)

(52) U.S. Cl.
CPC ........ *G05B 19/4099* (2013.01); *B29C 64/106* (2017.08); *B29C 64/386* (2017.08);
(Continued)

(58) Field of Classification Search
None
See application file for complete search history.

(56) References Cited

U.S. PATENT DOCUMENTS

2009/0020901 A1*  1/2009  Schillen ................. B29C 70/88
                                                        264/31
2013/0242317 A1*  9/2013  Leavitt .................. B41J 29/393
                                                        358/1.8
(Continued)

*Primary Examiner* — Jeffrey M Wollschlager
*Assistant Examiner* — Armand Melendez
(74) *Attorney, Agent, or Firm* — JCIPRNET (57) ABSTRACT

A three-dimensional printing apparatus and a method for calibrating printing inaccuracy thereof are provided. A printing head of the three-dimensional printing apparatus is adapted for moving along a straight printing path on a datum plane and simultaneously feeding out forming material, so as to generate a layer object on a supporting surface of a platform. If a path distance of the straight printing path is greater than a threshold, a plurality of linear compensation relationships respectively corresponding to a plurality of first zones of the supporting surface are used for calculating a first compensation value of a starting point and a second compensation value of an ending point. If the path distance of the straight printing path is not greater than the threshold, a common compensation values is decided based on at least one of second zones and which is corresponding to the starting point and the ending point.

7 Claims, 4 Drawing Sheets

(51) Int. Cl.
- *B33Y 50/02* (2015.01)
- *B29C 64/40* (2017.01)
- *B29C 64/106* (2017.01)
- B33Y 10/00 (2015.01)
- B33Y 30/00 (2015.01)

(52) U.S. Cl.
CPC ............. *B29C 64/40* (2017.08); *B33Y 50/02* (2014.12); *B33Y 10/00* (2014.12); *B33Y 30/00* (2014.12); *G05B 2219/35134* (2013.01); *G05B 2219/49007* (2013.01)

(56) References Cited

U.S. PATENT DOCUMENTS

| | | | |
|---|---|---|---|
| 2015/0057781 A1* | 2/2015 | Din | G05B 19/4086 700/98 |
| 2016/0236416 A1* | 8/2016 | Bheda | B29C 64/386 |
| 2016/0332384 A1* | 11/2016 | De Pena | B33Y 30/00 |

\* cited by examiner

THREE-DIMENSIONAL PRINTING APPRATUS AND METHOD FOR CALIBRATING PRINTING INACCURACY THEREOF

CROSS-REFERENCE TO RELATED APPLICATION

This application claims the priority benefit of Chinese application serial no. 201510304346.5, filed on Jun. 5, 2015. The entirety of the above-mentioned patent application is hereby incorporated by reference herein and made a part of this specification.

BACKGROUND

Technical Field

This technical fields to a printing apparatus, and more particularly, to a three-dimensional printing apparatus, and a method for calibrating printing inaccuracy thereof.

Description of Related Art

With the advancements in computer-aided manufacturing (CAM), three-dimensional (3D) printing developed by manufacturers are capable of rapidly manufacturing original designs. 3D printing technology is in actuality a generic term for a series of rapid prototyping (RP) with the fundamental principle being lamination, by scanning the inside of X-Y surfaces in rapid prototyping machines and forming the cross sections of work pieces, and intermittently displace layer thickness, eventually forming 3D objects. 3D printing technology is capable of unlimited geometry shapes, and the more sophisticated the parts, the more RP technology can demonstrate its superiority with the vast savings in manpower and machining. Within the shortest time, 3D computer-aided design (CAD) software is capable of realistically presenting in tangible form and with the geometry shape realistically felt and even parts compatibility can be tested and function testing are possible.

In general, most of the rapid prototyping 3D printing apparatus currently available print 3D objects of the digital 3D models by reading a digital 3D model. However, limited by inaccuracies of mechanical structures or the state of the craft, tilting or uneven surface of the platform used to support building materials in 3D printing apparatus can occur. When the platform is tilted or has uneven surface, because the printing head still stacks building materials based on the coordinate of a horizontal platform, the 3D objects printed can be significantly different from what we expected, lowering the print quality and yield rate.

SUMMARY

This disclosure provides a 3D printing apparatus and a method for calibrating printing inaccuracy capable of adjusting the printing height of each printing point based on the actual condition of the platform, thereby effectively improving the printing quality.

One of the exemplary embodiments provides a 3D printing apparatus, including a platform and a printing head. A printing head is disposed above the platform and configured to move along a straight printing path on a datum plane and simultaneously feeding out a forming material, so as to produce a layer object on a supporting surface of the platform. The above-described straight printing path includes a starting point and an ending point, and the method includes the following steps. 3D printing information of the layer object is obtained, and whether a path distance between the starting point and the ending point is greater than a threshold value is determined. If the path distance is greater than the threshold value, by using linear compensation relationships respectively corresponding to a plurality of first zones of the supporting surface, a first compensation value of the starting point and a second compensation value of the ending point are calculated. Then, a printing height of the starting point is calibrated based on the first compensation value with respect to the datum plane, and a printing height of the ending point is calibrated based on the second compensation value with respect to the datum plane. If the path distance is not greater than the threshold value, a common compensation value is decided based on at least one of the second zones which corresponds to the starting point and the ending point, and based on the common compensation value with respect to the datum plane the printing height corresponding to the starting point and the printing height corresponding to the ending point are calibrated.

From another viewpoint, one of the exemplary embodiments provides a 3D printing apparatus including a platform, a printing head, a touch sensor, and a controller. The platform includes a supporting surface and a plurality of calibration position points on the supporting surface. The calibration position points divide the supporting surface into a plurality of first zones. The printing head disposed above the platform, and the printing head is configured to move along the datum plane and along the direction of a no mal line of the datum plane. The touch sensor is disposed on a nozzle of the printing head. The controller connected to the printing head controls the printing head to move along the direction of the normal line and toward the calibration position points on the supporting surface from a predetermined height until the touch sensor is in contact with the calibration position point, so as to obtain the compensation reference values of the calibration position points relative to the datum plane. The compensation reference values decide the linear compensation relationships of the first zones. The first zones are divided, resulting a plurality of second zones, and the controller based on the linear compensation relationships calculates a number of reference compensation values corresponding to the second zones. The controller records the reference compensation values. The controller by using the linear compensation relationships and based on compensation values calibrates a printing height of the starting point and a printing height of the ending point, to obtain the first coordinate of the starting point and the second coordinate of the ending point. The controller based on the first printing coordinate and the second printing coordinate controls the printing head to move and simultaneously feeds out forming material.

Based on the above, in the embodiments of the disclosure, the printing head may be controlled to move upwards or downwards from a predetermined height until the printing head is in contact with the a plurality of calibration position points on the platform respectively, thus obtaining the compensation reference values corresponding to the calibration position points. The compensation values corresponding to the top points of the first zones are used to decide the linear compensation relationships of the first zones. The first zones may be divided and result in a plurality of second zones. The compensation reference values corresponding to the second zones are generated based on the above-described linear compensation relationships. Accordingly, by determining whether the path distance between the starting point and the ending point is greater than the threshold value, the degree of compensation can be decided based on the linear compensation relationships or the compensation reference values. As described above, in this disclosure the printing height of each printing point can be adjusted based on the platform actual condition and the length of the printing path, such that the printing head is capable of, based on the model coordinate, moving to operate at the post-calibration working point, such that the yield and execution accuracy are not affected by tilting or inaccuracy in surface height.

The following embodiments and figures illustrate the above-described features.

DESCRIPTION OF THE EMBODIMENTS

Figure 1:
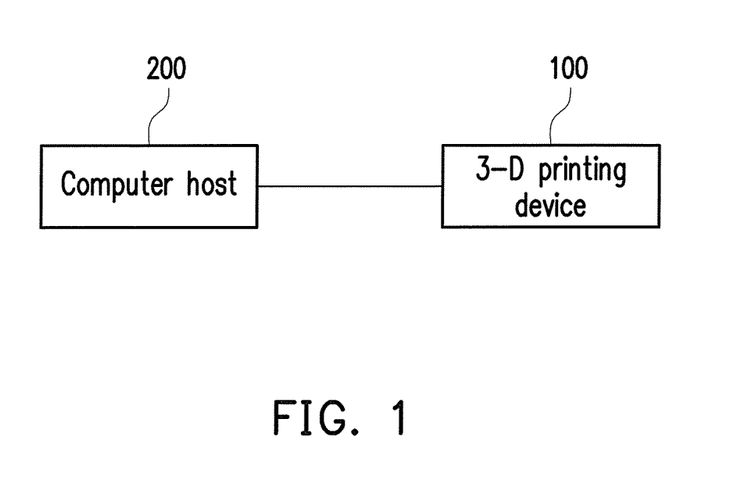
FIG. 1 is a diagram showing the operation of a 3D printing apparatus from an embodiment.

FIG. 1 is a diagram showing the operation of a 3D printing apparatus from an embodiment. Referring to FIG. 1, a 3D printing apparatus 100 of the present embodiment is adapted to printed out a 3D object based on 3D model information. In the present embodiment, the 3D model information may be a 3D digital image file, which may be made by, for example, a computer host 200 through computer-aided design (CAD) or animation modeling software. The computer host 200 slice the digital 3D model information into a plurality of cross section information for the 3D printing apparatus 100 to manufacturer a plurality of 3D sectional layers, based on which stacks a 3D object.

Figure 2:
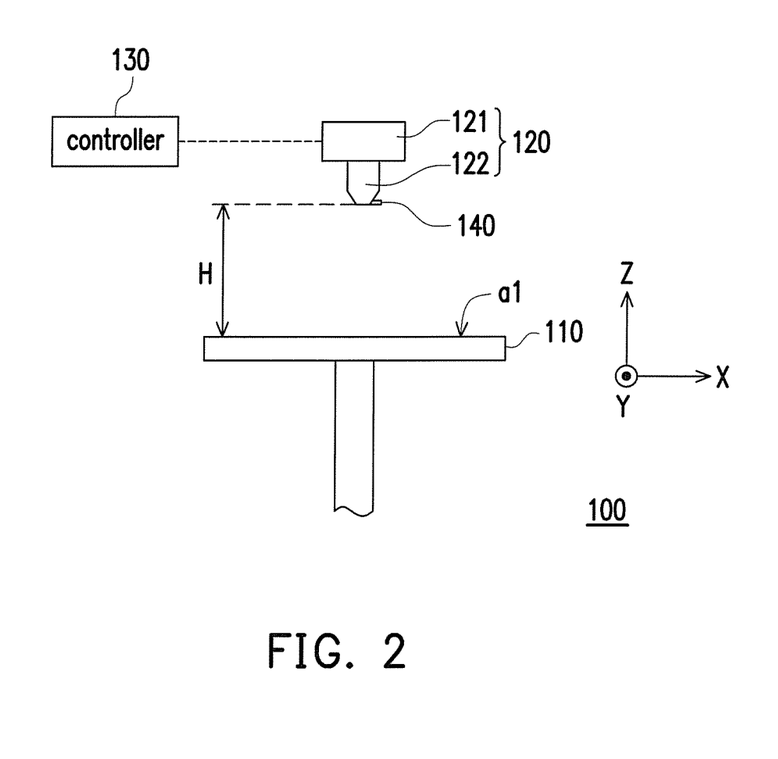
FIG. 2 is a diagram showing the 3D printing apparatus from an embodiment.

FIG. 2 is a diagram showing the 3D printing apparatus from an embodiment. Referring to FIG. 2, the 3D printing apparatus 100 includes a platform 110, a printing head 120, a touch sensor 140, and a controller 130. Right angle coordinate are provided to describe their respective components and movements. The platform 110 includes a supporting surface a1, the printing head 120 includes a base 121 and a nozzle 122. The base 121 bears the nozzle 122. The nozzle 122 is capable of extruding forming materials melted to fluid form. The base 121, controlled by the controller 130, moves along an XY surface toward the normal line of the XY surface (Z axial) so as to coat the melted forming material on the supporting surface a1 of the platform 110.

The controller 130, coupled to the printing head 120, is capable of reading the 3D model information provided by a computer host 200 and based on the information controls the overall operation of a 3D printing apparatus 100 to print a 3D object 80. For example, the controller 130 may control the path of the base 121 based on the 3D digital model information. The controller 130 may be, but not limited to, a central processing unit, a chip set, a microprocessor, an embedded controller, or other apparatus capable of performing calculation.

Note that the controller 130 based on the cross section information provided by the computer host 200 controls the moving path of the printing head 120 and the 3D printing apparatus 100 based on the cross section information of the 3D model prints out at least one layer object on the supporting surface a1. The described layer object stacks to a 3D object corresponding to the 3D model information. The control code for controlling the printing head 120 may be generated based on the cross section information of each layer object, such that the controller 130 of the 3D printing apparatus 100 may be based on the control code to control the components of the 3D printing apparatus 100, thereby forming each layer object on the platform 110 layer by layer. In an embodiment, the described control code is the 3D printing information which can be read by the controller 130 and used to execute printing functions. For example, in an embodiment, the control code is a G code file.

More particularly, the control code may include a plurality of printing points of the same layer object. The Z coordinate of the printing points of the same layer object in the original control code file are the same as each other. The printing points of the same layer object form at least one straight line printing path on the XY surface. As a result, the controller 130 is capable of, based on the coordinate of each printing point, moving the printing head 120 and causing the printing head 120 to feed a forming material, and as a result the layer object is formed on the supporting surface a1. In other words, the path on which the printing head 120 moves on the XY surface contains of at least one straight printing path. Each straight printing path includes a starting point and an ending point. A single printing head may be the ending point of a straight printing path or the starting point of another straight printing path.

A touch sensor 140 is disposed on the nozzle 122 of the printing head 120, capable of sensing whether the printing head 120 is in contact with the supporting surface a1 of the platform 110. In the present embodiment, the touch sensor 140 may be a light reflection type component, a limit switch, or a proximity switch. This disclosure is not limited to a particular type.

In an embodiment of this disclosure, the controller 130 is capable of using the touch sensor 140 disposed on the printing head 120 and obtain the compensation reference values of a plurality of calibration position points on the platform 110. More particularly, the touch sensor 140 responds to contact with calibration point and sends a plurality of touch signals each corresponding the calibration points to the controller 130. The controller 130 is capable of positioning the printing head 120 based on the above-described touch signals so as to obtain the basic compensation values of the calibration position points with respect to the XY surface. More particularly, the platform 110 includes a plurality of calibration position points which are located on the supporting surface a1. The controller 130 first moves the nozzle 140 to a position to directly above the calibration position points, and moves down along a Z axis from a predetermined height H until the touch sensor 140 is contact with the supporting surface a1. The controller 130 is capable of obtaining the basic compensation values by calculating the total steps of the printing head 120's moving along the Z axis. And so on, the basic compensation values of each calibration position points can be obtained by the above-described process.

It could be noted that, if the supporting surface a1 of the platform 110 is not level or there is unevenness on the surface, the compensation reference values corresponding to the calibration points will be different. More specifically, if the supporting surface a1 of the platform 110 is not level or has uneven surface, the distance between the platform 110 and the printing head 120 at a certain height is not a fixed ideal values. Based on the coordinate position of the printing head on the XY surface, the controller 130 is capable of compensating for the printing height using the compensation reference values obtained by the touch sensor 140, so as to make the distance between the supporting surface a1 and the printing head 120 to be more consistent while printing a single layer object.

In an embodiment, the calibration position points on a supporting surface a1 divide the supporting surface a1 into a plurality of first zones. The first zones are in rectangular shape, and the calibration position points are located at the top points of the first zones. The linear compensation relationships corresponding to the first zones are determined based on the compensation reference values of the calibration position points at the top points of the first zones. Based on this, the controller 130 is capable of using the linear compensation relationships corresponding to the first zones of the supporting surface a1 and calculate a first compensation value of the starting point and a second compensation value of the ending point. The printing height corresponding to the starting point is calibrated based on the first compensation value with respect to the XY surface, and the printing height of the ending point is calibrate based on the second compensation value with respect to the XY surface.

Figure 3A:
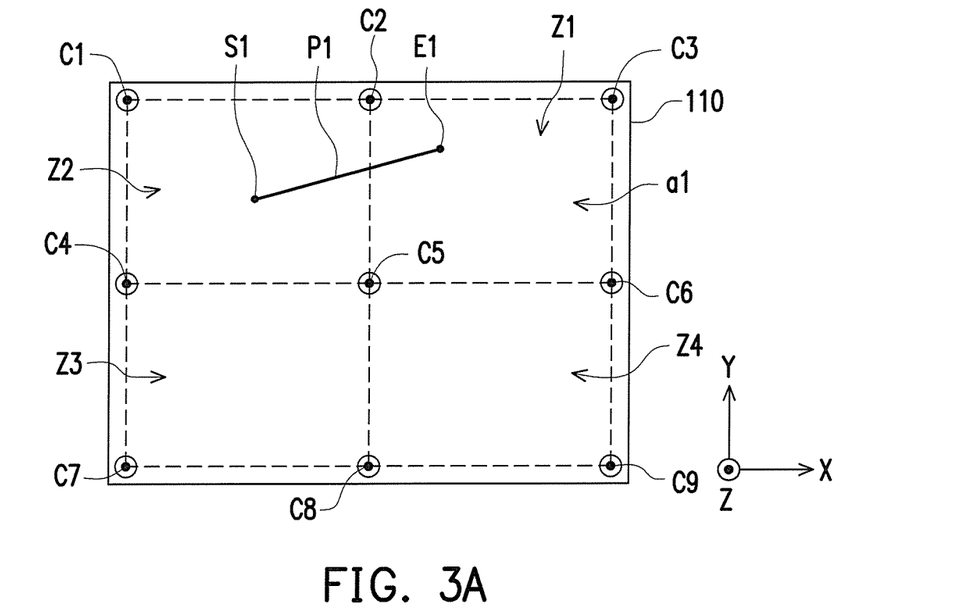
FIG. 3A is a diagram showing the calibration position points and the first zones from an embodiment.

To further explain the calibration position points and how the starting and ending points are used to calculate the compensation values corresponding to the printing height, FIG. 3A illustrates the calibration position point and the first zones from an embodiment. Referring to FIG. 3A, the supporting surface a1 includes 9 calibration position points C1 to C9. The calibration position point C5 is located at the center of the supporting surface a1. The calibration position points C1, C3, C7, and C9 are located at the four corners of the supporting surface a1. The calibration position points C2, C4, C6, and C8 are positioned within the four sides of the supporting surface. Disposed in this manner, the supporting surface a1 is divided into 4 first zones, Z1-Z4, based on the calibration position points C1 to C9 The linear compensation relationships of the first zone Z1 is determined based on the basic compensation values of the calibration position points C2, C3, C5, C6. And so on, the linear compensation relationship of the first zone Z2 is determined based on the basic compensation values of the calibration position points C1, C2, C4, C5. The linear compensation relationships of the first zone Z3 is determined based on the basic compensation values of the calibration position points C4, C5, C7, C8. And so on. The linear compensation relationship of the first zone Z4 is determined based on the basic compensation values of the calibration position points C5, C6, C8, C9.

Note that in the present embodiment, there are 9 calibration position points, C1 to C9, to divide the supporting surface a1 into 4 first zones. But those with ordinary skill in the art may dispose any number of position points on the platform 110 based on the actual need without limitation set by this disclosure.

Figure 4:
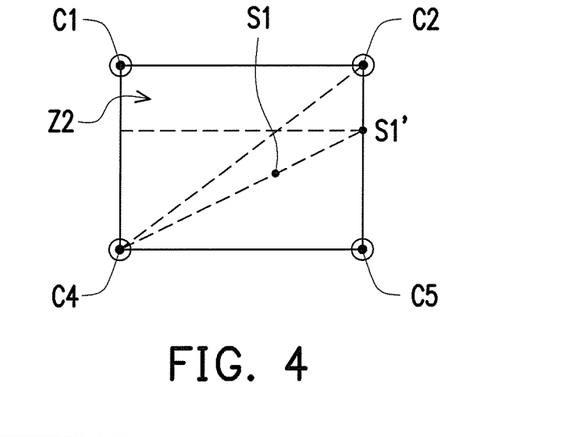
FIG. 4 is a diagram showing the first zones and the linear compensation relationship of an embodiment.

In FIG. 3A, suppose a straight line printing path P1 includes a starting point S1 and an ending point E1. And the controller 130 uses the linear compensation relationships corresponding to the first zones Z1 and Z2 of the supporting surface a1 and calculate a first compensation value of the starting point S1 and a second compensation value of the ending point E1. For example, FIG. 4 shows the first zones and the linear compensation relationships of an embodiment. See FIG. 4, the controller 130 may obtain a coordinate of a projection point S1' on the XY surface based on the coordinates of the calibration position points C2, C4, C5 and a coordinate of the starting point S1 on the XY surface. Then, the controller 130 can estimate the compensation estimation value of the projection point S1' based on the basic compensation values corresponding to the calibration position points C2 and C5. Thereafter, based on the coordinate of the calibration position point C4 on the XY surface, the coordinate of the starting point S1 on the XY surface, the coordinate of the projection point S1' on the XY surface, and the corresponding compensation estimation value of the projection point S1' and the basic compensation value of the calibration point C4, the controller 130 may calculate the first compensation value of the starting point S1 based on a linear relationship prediction. Similarly, the second compensation reference value of the ending point E1 may be obtained based on a similar calculating process. The controller 130 is capable of calibrating a printing height of the starting point S1 based on the first compensation value relative to the XY surface, and calibrating a printing height of the ending point E1 based on the second compensation value relative to the XY surface.

It should be mentioned that with respect to the layer object including a plurality of straight printing paths, it is very time-consuming to calculate the first compensation value and the second compensation value as to each starting and ending point. Thus, in an embodiment of this disclosure, based on the path distance between the starting point and the ending point, the controller 130 may decide to use first compensation value and second compensation value which is different from each other to compensate the printing height, or decide to use a same common compensation values to compensate the printing height of the starting point and the ending point. The described common compensation values may be saved to a list by advance calculation, such that the controller 130 may obtain the common compensation values by looking-up the list, for saving calculation time. Additionally, with respect to 3D printing apparatus with printing head that moves slower on the Z axis, using common compensation value reduces the frequency of the printing head changes when printing a layer object, thus reducing printing time.

Based on the above, in an embodiment, the controller 130 may obtain 3D printing information of the layer object and determine whether a path distance between the starting point and the ending point is greater than a threshold value. The controller 130 is capable of obtaining directly based on the coordinate of the starting point and the ending point and calculate the path distance between the starting point and the ending point, and directly compare whether the path distance between the starting point and the ending point is greater than a threshold value (as an example and not limiting this disclosure: 5 cm). In another embodiment, the controller 130 may decide whether the path distance between the starting point and the ending point is greater than a threshold value based on the second zones where the starting point and the ending point locate in. As an example: when the second zones corresponding to the starting point and the ending point are not adjacent to one another, the controller 130 determines the path between starting point and the ending point is greater than the threshold value.

If the path distance is greater than the threshold value, the controller 130 calculates the first compensation value of the starting point and the second compensation value of the ending point by using the linear compensation relationships respectively corresponding to the first zones of the supporting surface. If the path distance is not greater than the threshold value, the controller 130 decides the common compensation value based on at least one of second zones which corresponds to the starting point and the ending point, and based on the common compensation value respecting the datum plane calibrates the printing height of the starting point and the printing height of the ending point. The first zones are divided into second zones covering smaller areas.

Figure 3B:
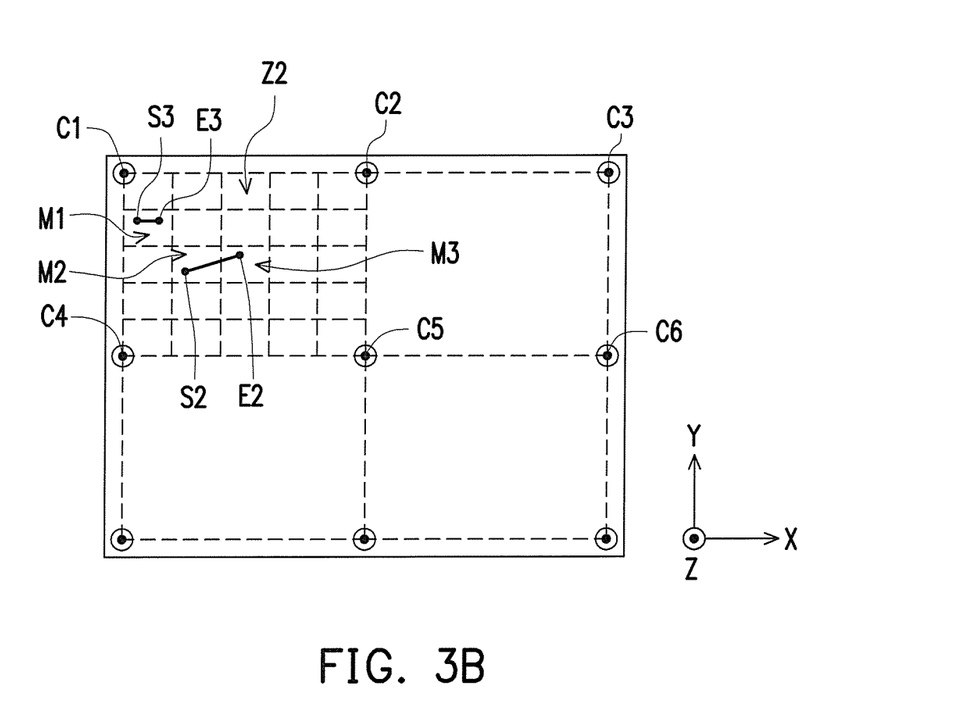
FIG. 3B is a diagram showing the calibration position points and the second zones of an embodiment.

To further explain how to obtain the common compensation values, FIG. 3B illustrates the calibration position points and the second zones of an embodiment of this disclosure. Referring to FIG. 3B, each first zone is divided into a plurality of equal parts of second zones. For example, the first zone Z2 is divided into a plurality of 5-by-5 equal parts of second zones. And so on, the first zones Z1, Z3, and Z4 may be divided into 25 second zones as well. In other words, the supporting surface may include 100 second zones. Each second zone has a corresponding compensation reference value, the above described compensation reference value of each second zone is recorded in the storage unit of the 3D printing apparatus 100. Based on this, when the controller 130 determines the path distance is not greater than the threshold, the controller 130 may directly use the saved compensation reference values and compensate for the printing heights of the starting and ending points. Noted that in the present embodiment, each first zone includes 25 second zones, but those of ordinary skill in the art may adjust the number of second zones based on demand, and this disclosure does not limit the number of second zones.

More particularly, as shown in FIG. 3B, when the starting point S3 and the ending point E3 are located in the same second zone M1, the controller 130 may directly use the compensation reference value corresponding to the second zone M1 as the common compensation value. The controller 130 then uses the common reference value (the compensation reference value corresponding to the second zone M1) and compensates the printing heights of the starting point S3 and the ending point E3. When the starting point S2 and the ending point E2 are located in different second zones M2 and M3, the controller 130 averages the compensation reference values corresponding to the second zones M2 and M3, and use the average value as the common compensation value. Then the controller 130 then uses the common reference value (the average value) to compensate the printing heights of the starting point S2 and the ending point E2.

It should be noted that in an embodiment the controller 130 is capable of calculating the compensation reference values respectively corresponding to the second zones based on the basic compensation value of each of the calibration position points. More particularly, the controller 130 is capable of setting a coordinate point in the second zone as a reference point. The controller 130 is capable of using the calculation method as shown in FIG. 4 to calculate the compensation values of the reference point in each of the second zone, and serve the compensation values of the reference points as the compensation reference values of the second zones. In an embodiment, the controller 130 for example is capable of calculating the compensation reference values using the center points of the second zones as reference points.

If the path distance between the starting point and the ending point is greater than a threshold value, the compensation level of the printing heights of the starting point and the ending point may be obtained through these linear compensation relationships. Additionally, the first zones may be divided and result in a plurality of second zones. The compensation reference values corresponding to the second zones may be generated one by one based on the above-described linear compensation relationships. Then, if the path distance between the starting point and the ending point is not greater than the threshold value, the printing heights of the starting point and the ending point are compensated by directly using the corresponding compensation reference values according to the positions of the starting point and the ending point. As described above, in this disclosure the printing height of each printing point is capable of being adjusted based on the actual condition of the platform and the length of the printing path, allowing the printing head to move and operate on the working point after calibration which is based on the printing coordinate after calibration.

Figure 5A:
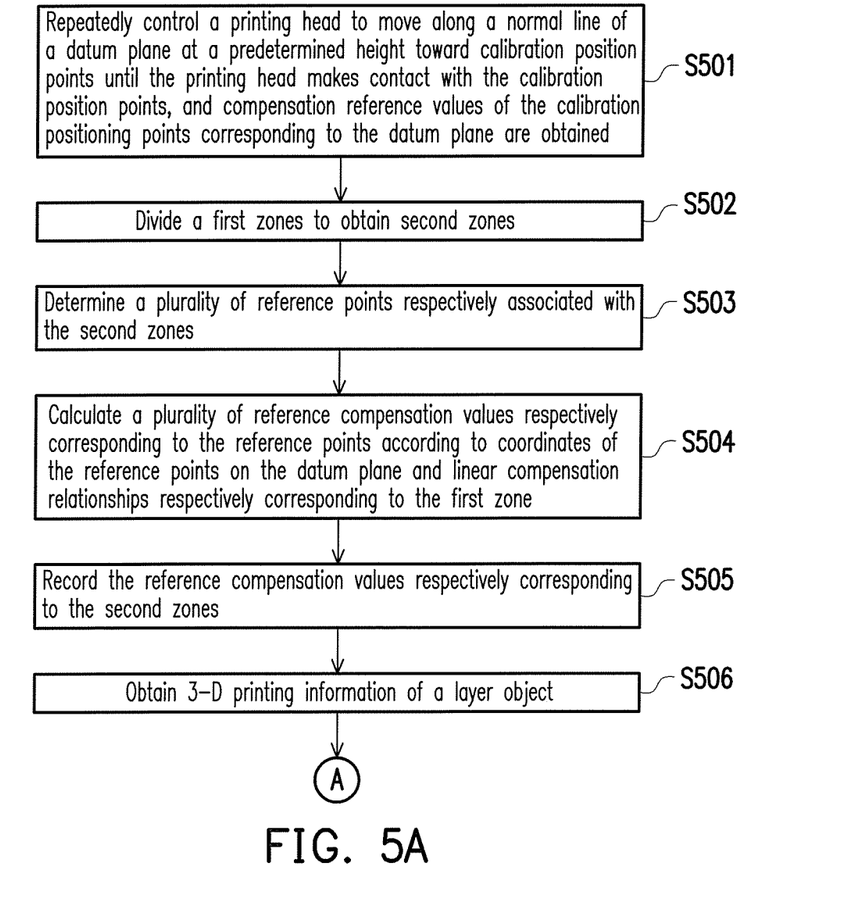
FIGS. 5A and 5B are diagrams showing the flowchart of the printing inaccuracy compensation method from an embodiment.
Figure 5B:
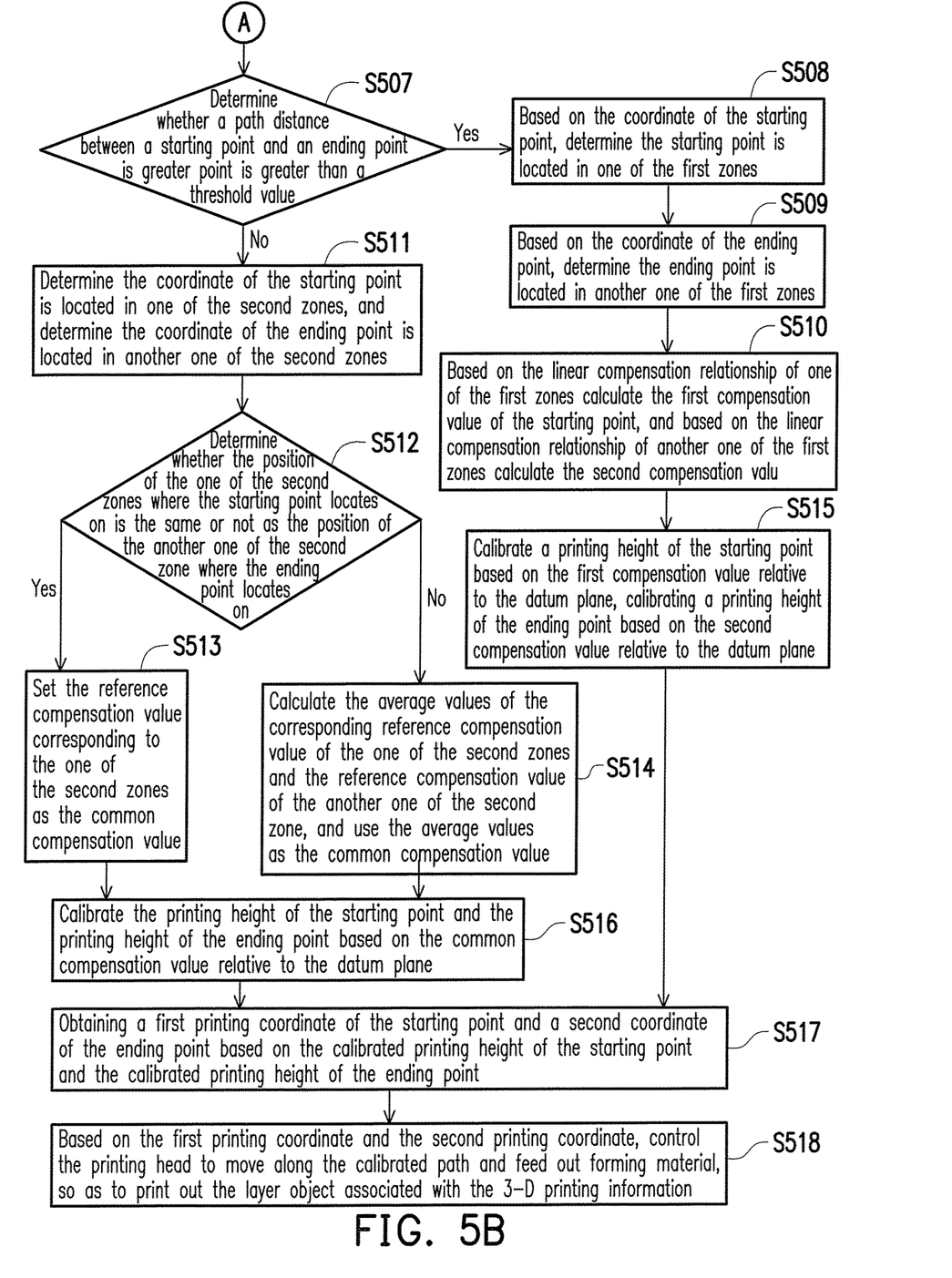

FIGS. 5A and 5B are diagrams showing the flowchart of the printing inaccuracy calibration method of an embodiment. In the present embodiment, the described printing inaccuracy calibration method may be adapted as illustrated by the 3D printing apparatus 100 in FIG. 2. But this disclosure is not limited to this illustration. Also, the specifics of each step have already been described in the above mentioned embodiment.

Refer to FIGS. 5A and 5B, in step S501, repeatedly controlling a printing head to move along a normal line of a datum plane at a predetermined height toward calibration position points until the printing head makes contact with the calibration position points, such that compensation reference values of the calibration positioning points corresponding to the datum plane are obtained. The platform of the 3D printing apparatus includes a plurality of calibration position points, which divide the supporting surface of the platform into a plurality of first zones. The basic compensation values of the calibration position points at the top points of the first zones are used to decide the linear compensation relationships respectively corresponding to the first zones. In step S502, dividing the first zones to obtain the second zones. In step S503, determining a plurality of reference points respectively associated with the second zones deciding. In step S504, calculating a plurality of reference compensation values respectively corresponding to the reference points according to coordinates of the reference points on the datum plane and linear compensation relationships respectively corresponding to the first zones. In step S505, recording the reference compensation values corresponding to the second zones. In step S506, obtaining the 3D printing information of the layer object.

In step S507, determining whether a path distance between the starting point and the ending point is greater than a threshold value. If the determination in step S507 is positive, in S508, based on the coordinate of the starting point, determining the starting point is located in one of the first zones. In step S509, based on the coordinate of the ending point, determining the ending point is located in another one of the first zones. In step S510, based on the linear compensation relationship of the one of the first zones calculating the first compensation value of the starting point, and based on the linear compensation relationship of the another one of the first zones calculating the second compensation value of the ending point. In step S515, calibrating a printing height of the starting point based on the first compensation value of the datum plane, calibrating a printing height of the ending point based on the second compensation value relative to the datum plane.

On the other hand, if the determination in step S507 is negative, in step S511, determining the coordinate of the starting point is located in one of the second zones, and determining the coordinate of the ending point is located in another one of the second zones. In step S512, determining whether the position of the one of the second zones where the starting point locates on is the same or not as the position of the another one of the second zone where the ending point locates on. If the determination in step S512 is positive, in step S513, setting the reference compensation values corresponding to the one of the second zones as the common compensation values. If the determination in step S512 is negative, in step S514, calculating the average value of the corresponding reference compensation values of the one of the second zones and the reference compensation values of the another one of the second zone if the one of the second zones is different from the another one of the second zones. Use the average value as the common compensation value. In step S516, calibrating the printing height of the starting point and the printing height of the ending point based on the common compensation values relative to the datum plane.

In step 517, obtaining the first printing coordinate of the starting point and the second coordinate of the ending point based on the calibrated printing height of each of the starting point and the calibrated printing height of the ending point. In step 518, based on the first printing coordinate and the second printing coordinate, controlling the printing head to move along the calibrated path and feed out forming material, so as to print out a layer object associated with the 3D printing information.

As described above, the printing height of each printing point is capable of being adjusted based on the actual condition of the platform and the length of the printing path, which allows the printing head to move to the calibrated location for performing printing operation according to the calibrated coordinate. Such that, the print error and print inaccuracy caused by tilting of the platform and undulation of the surface of the platform may be improved. Further, through compensation of the printing height of the starting point and the end point using common compensation values, sudden elevating and dropping of the printing head affecting printing quality is prevented. Additionally, by compensating printing height by directly using saved compensation reference values, calculation time and speed of printing are improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for calibrating printing inaccuracy, adapted to calibrate at least a straight printing path of a printing head on a datum plane, wherein the datum plane is a reference plane of the printing head, wherein the datum plane is a XY plane in an XYZ coordinate system, wherein the printing head is controlled to move along the straight printing path and simultaneously feeds out a forming material so as to generate a layer object on a supporting surface, and the straight printing paths respectively comprise a starting point and an ending point, the method comprising:

obtaining three-dimensional printing information of the layer object; determining whether a path distance between the starting point and the ending point is greater than a threshold value;

dividing the supporting surface into a plurality of first zones using a plurality of calibration position points of the supporting surface;

determining a plurality of linear compensation relationships of each of the first zones using a plurality of first reference compensation values of the calibration position points at vertices of each of the first zones;

dividing the first zones to obtain a plurality of second zones and calculating a plurality of second reference compensation values along the Z-axis respectively corresponding to the second zones;

when the path distance between the starting point and the ending point is greater than the threshold value, then calculating a first compensation value of the starting point and a second compensation value of the ending point, both the first compensation value and the second compensation value being along a Z-axis, by using the linear compensation relationships respectively corresponding to the first zones of the supporting surface, calibrating a printing height corresponding to the starting point based on the first compensation value relative to a datum plane, calibrating a printing height corresponding to the ending point based on the second compensation value relative to the datum plane, wherein the first compensation value of the starting point and the second compensation value of the ending point are calculated by respectively inputting a position of the starting point and a position of the ending point into linear functions, when the path distance between the starting point and the ending point s not greater than the threshold value, then determining a common compensation value along the Z-axis by using at least one of the second reference compensation values of at least one of the second zones, wherein the at least one of the second zones is corresponding to the starting point and the ending point, and calibrating the printing height corresponding to the starting point and the printing height corresponding to the ending point based on the common compensation value relative to the datum plane, wherein a calibrated path is determined based on the calibrated printing height of the starting point and the calibrated printing height of the ending point, wherein the method further comprises:

controlling the printing head to move along the calibrated path and feeding out forming material to print out the layer object, and using the common compensation value or both the first compensation value and the second compensation value to compensate differences from the datum plane to the supporting surface and to adjust the height of the printing head while printing, wherein the method further comprises:

repeatedly controlling the printing head to move respectively toward the calibration position points along a normal line direction of the datum plane at a predetermined height until the printing head is in contact with the calibration position points to respectively obtain the first reference compensation values respectively corresponding to the calibration position points relative to the datum plane, wherein the linear compensation relationships are the linear functions formed by the positions of the calibration position points and the first reference compensation values of the calibration position points.

2. The method for calibrating printing inaccuracy of claim 1, wherein a shape of the first zones is rectangular.

3. The method of claim 1, wherein the step of calculating the first compensation value of the starting point and the second compensation value of the ending point by using the linear compensation relationships respectively corresponding to the first zones of the supporting surface comprise:

determining the starting point is located in one of the first zones based on a coordinate of the starting point, and determining the ending point is located in another one of the first zone based on a coordinate of the ending point; and calculating the first compensation value of the starting point according to a linear compensation relationship of the one of the first zones, and calculating the second compensation value of the ending point according to a linear compensation relationship of the another one of the first zones.

4. The method of claim 1, wherein the second reference compensation values respectively corresponding to reference points are calculated based on coordinates of the reference points on the datum plane and the corresponding linear compensation relationships; the reference points are respectively inside the corresponding second zones, and the method further comprising:

recording the second reference compensation values respectively corresponding to the second zones.

5. The method of claim 4, wherein the step of determining the common compensation value based on the at least one of the second zones corresponding to the starting point and the ending point comprises:

determining one of the second zones the starting point locates in, determining one of the second zones the ending point locates in;

determining whether the one of the second zones the starting point locates in is the same or not the same as the one of the second zones the ending point locates in; and setting one of the second reference compensation values corresponding to the one of the second zone the starting point locates in as the common compensation value if the one of the second zones the starting point locates in is the same as the one of the second zones the ending point locates in.

6. The method of claim 5, comprising:

calculating an average value of one of the second reference compensation values corresponding to the one of the second zones the starting point locates in and one of the second reference compensation values corresponding to the one of the second zones the ending point locates in if the one of the second zones the starting point locates in is not the same as the one of the second zones where the ending point locates in.

7. The method of claim 1, comprising:

obtaining a first printing coordinate of the starting point and a second printing coordinate of the ending point based on the calibrated printing height of the starting point and the calibrated printing height of the ending point; and controlling the printing head to move along the calibrated path and feed out the forming material at the same time to print out the layer object associated to the three-dimensional printing information based on the first printing coordinate and the second printing coordinate.

* * * * *